United States Patent
Wastlhuber

(10) Patent No.: US 9,703,749 B2
(45) Date of Patent: Jul. 11, 2017

(54) METHOD AND DEVICE FOR SYNCHRONIZING A CONTROL UNIT AND AT LEAST ONE ASSIGNED PERIPHERAL UNIT

(71) Applicant: JOHANNES HEIDENHAIN GMBH, Traunreut (DE)

(72) Inventor: Robert Wastlhuber, Garching (DE)

(73) Assignee: JOHANNES HEIDENHAIN GMBH, Traunreut (DE)

( * ) Notice: Subject to any disclaimer, the term of this patent is extended or adjusted under 35 U.S.C. 154(b) by 93 days.

(21) Appl. No.: 14/474,975

(22) Filed: Sep. 2, 2014

(65) Prior Publication Data

US 2015/0067202 A1    Mar. 5, 2015

(30) Foreign Application Priority Data

Aug. 30, 2013 (DE) ............... 10 2013 217 381
Sep. 12, 2013 (DE) ............... 10 2013 218 305

(51) Int. Cl.
*G06F 3/00* (2006.01)
*G06F 13/28* (2006.01)
(Continued)

(52) U.S. Cl.
CPC ....... *G06F 13/423* (2013.01); *G05B 19/0426* (2013.01)

(58) Field of Classification Search
CPC ... G06F 1/12; G06F 3/00; G06F 8/455; G06F 9/522; G06F 13/423; G06B 19/0426
(Continued)

(56) References Cited

U.S. PATENT DOCUMENTS 6,310,896 B1 * 10/2001 Langberg ............... H04L 7/042
                                                     370/503
7,805,541 B2    9/2010 Zehentner
(Continued)

FOREIGN PATENT DOCUMENTS

DE    10 2004 052 175 A1    5/2006
EP          1 253 494        10/2002

OTHER PUBLICATIONS

European Search Report issued in European Patent Application No. 14 16 9606, dated Feb. 24, 2015.

*Primary Examiner* — Idriss N Alrobaye
*Assistant Examiner* — Getente A Yimer
(74) *Attorney, Agent, or Firm* — Andrews Kurth Kenyon LLP

(57) ABSTRACT

In a method for synchronizing a control unit and at least one peripheral unit having actuators and/or sensors, the control unit and the peripheral unit exchange data with each other via a serial interface. The control unit transmits data to the at least one peripheral unit which is processed in the peripheral unit for the operation of the actuators and/or sensors, and at least one synchronization character is transmitted from the control unit to the peripheral unit for the synchronization. In this context, the synchronization character is appended by the control unit to a first data sequence of a data stream to be transmitted from the control unit to the peripheral unit, and the transmission of a second data sequence to be transmitted after the first data sequence is delayed in time on the part of the control unit, so that the second data sequence is transmitted by the control unit to the peripheral unit following the synchronization character.

21 Claims, 6 Drawing Sheets

(51) Int. Cl.
*G06F 5/00* (2006.01)
*G06F 13/36* (2006.01)
*G06F 13/362* (2006.01)
*G06F 13/372* (2006.01)
*G06F 13/42* (2006.01)
*G05B 19/042* (2006.01)

(58) Field of Classification Search
USPC .............................. 710/61, 25, 58, 118, 125
See application file for complete search history.

(56) References Cited

U.S. PATENT DOCUMENTS

| | | | |
|---|---|---|---|
| 2004/0008667 A1* | 1/2004 | Michaelis | H04L 1/0042 370/352 |
| 2008/0126662 A1* | 5/2008 | Rajbharti | G06F 13/28 710/308 |
| 2008/0228979 A1* | 9/2008 | Krig | G06F 13/385 710/260 |
| 2011/0296065 A1* | 12/2011 | Daecke | G06F 13/4291 710/61 |

* cited by examiner

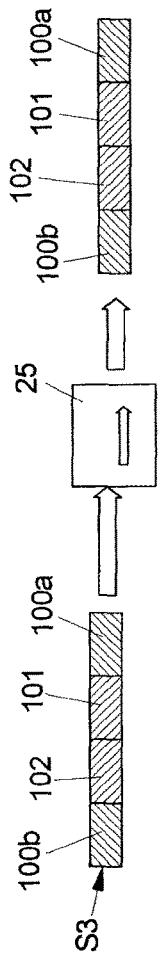
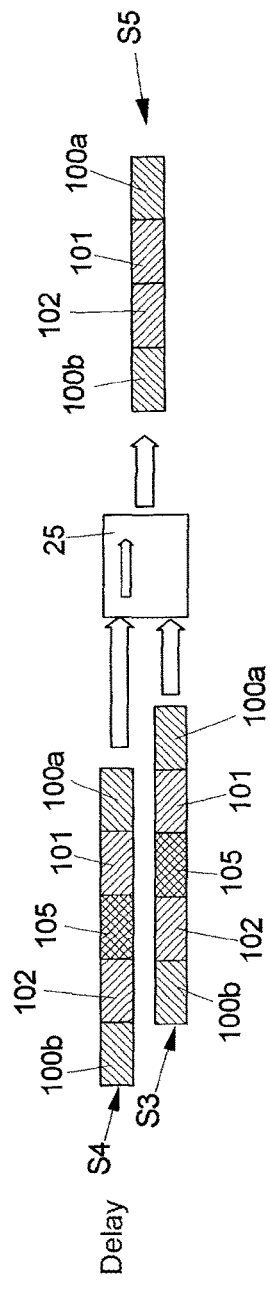
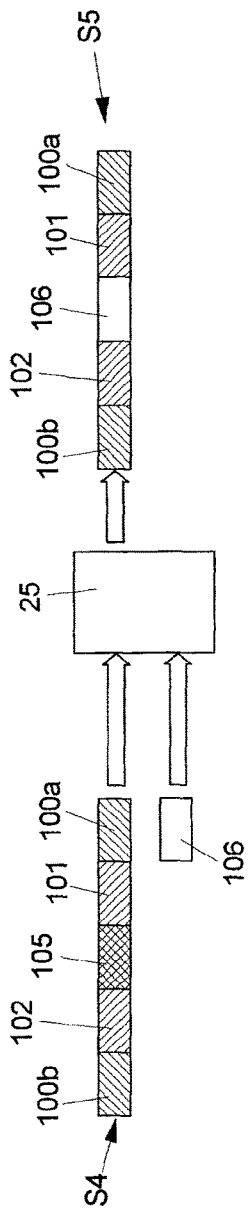

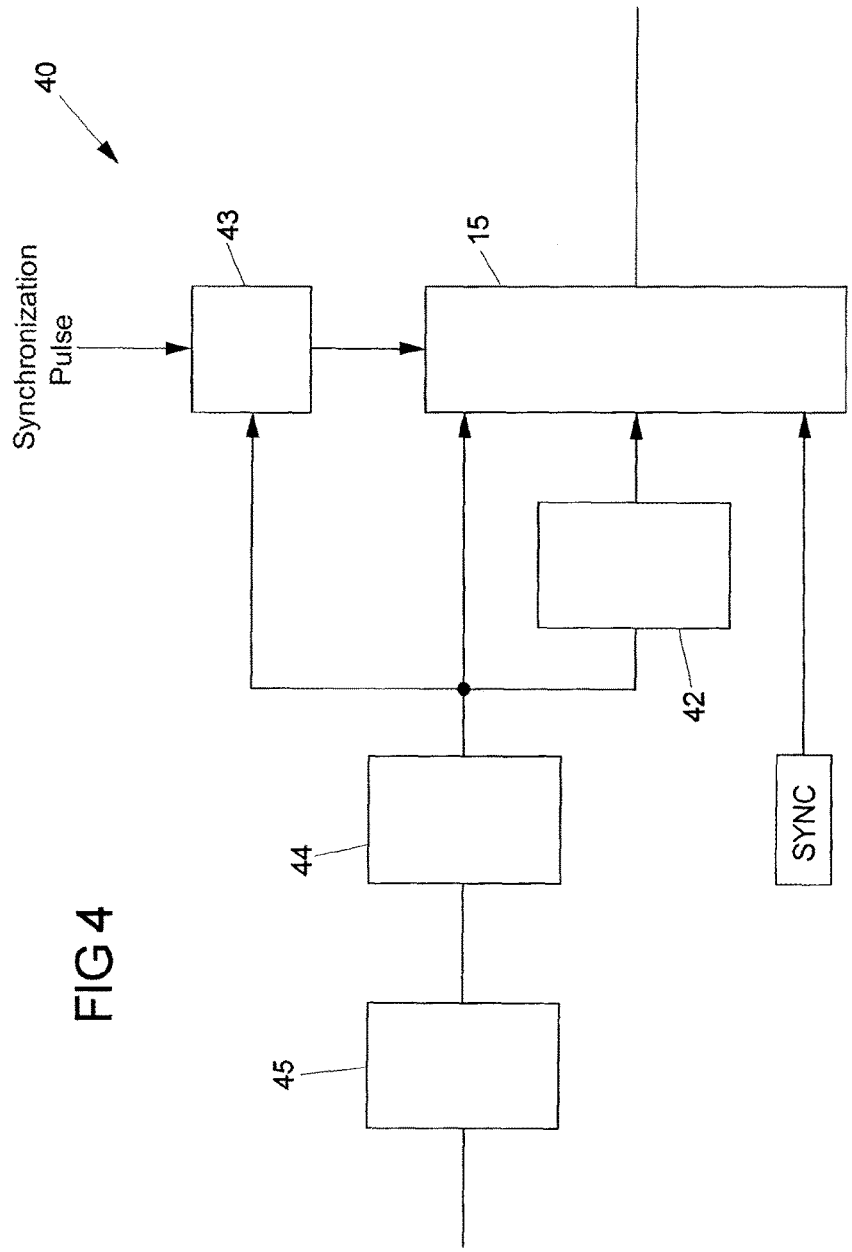

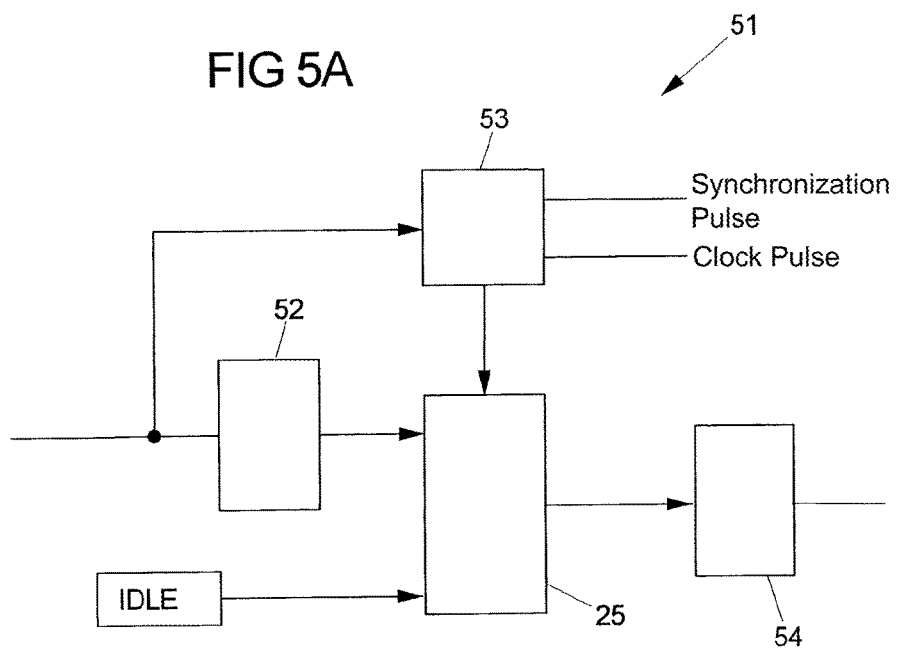
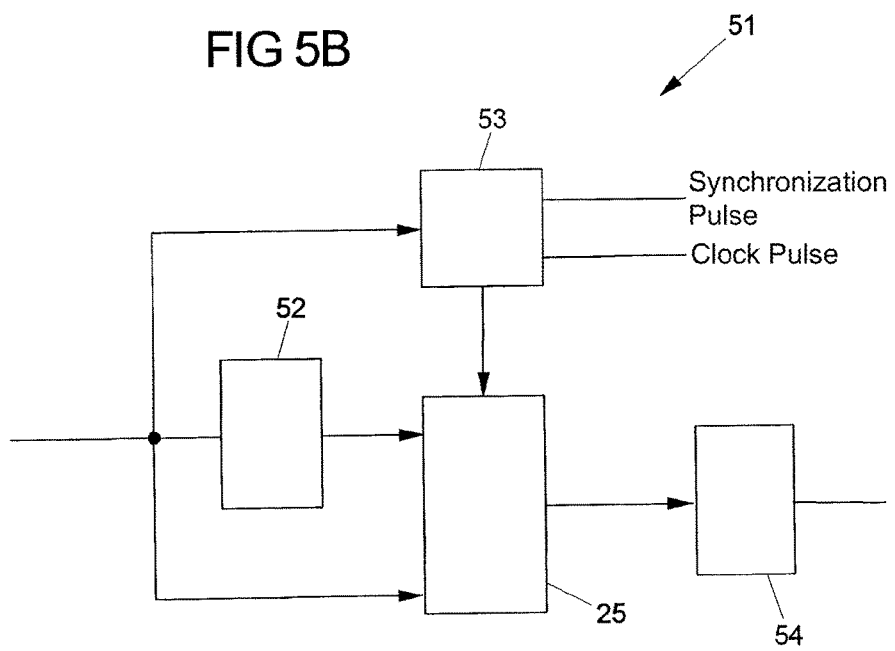

METHOD AND DEVICE FOR SYNCHRONIZING A CONTROL UNIT AND AT LEAST ONE ASSIGNED PERIPHERAL UNIT

CROSS-REFERENCE TO RELATED APPLICATIONS

The present application claims priority to Application No. 10 2013 217 381.4, filed in the Federal Republic of Germany on Aug. 30, 2013, and to Application No. 10 2013 218 305.4, filed in the Federal Republic of Germany on Sep. 12, 2013, each of which is expressly incorporated herein in its entirety by reference thereto.

FIELD OF THE INVENTION

The present invention relates to a method and a device for synchronizing a control unit on one hand and at least one assigned peripheral unit having actuators and/or sensors on the other hand, the control unit and peripheral unit, e.g., being connected to each other via a serial interface and thereby exchanging data.

BACKGROUND INFORMATION

A control unit (with the aid of a transmitter unit) may transmit data to at least one peripheral unit, which data is received in the peripheral unit (by a receiver unit) and used for operating the actuators or sensors. In this connection, it may also be data in the form of commands which are written into one or more actuators in order to trigger certain actions of a respective actuator, or which are intended to prompt the readout of instantaneous measured values from a sensor. A processing unit may be provided on the part of a respective peripheral unit in order to carry out these processing steps.

For example, the control unit may be a printed circuit board which has a sequencing control (processor) designed for the digital control, and the assigned peripheral units may be implemented as further printed circuit boards which in each case contain sensors (e.g., for measuring current) as well as actuators (e.g., in the form of power electronics, possibly with PWM modulators). The control unit as well as the assigned peripheral unit(s) are connected to each other for the exchange of data (e.g., using an 8b/10b coding) via a serial interface in the form of a duplex interface, for example. It may have a typical bandwidth between 100 Mbit/s and 200 Mbit/s. Such a system is described, for example, in German Published Patent Application No. 10 2004 052 175.

In that case, the data is usually transmitted serially with a specific clock pulse by the control unit to the respective peripheral unit, the latter, by way of timing recovery, being able to generate the clock pulse for the input/output of data and possibly the operation of the processing unit.

For a highly precise control of processes using the regulating device configured in the control unit, it is necessary that the processing unit of the respective peripheral unit, or in general, that the processing of data on the part of the peripheral unit be synchronized in time with the control unit. To that end, it is common to transmit what are referred to as synchronization characters from the control unit to a respective peripheral unit, and specifically, either via an additional synchronization line between the control unit and a respective peripheral unit or during an interruption in the data transmission between the control unit and a respective peripheral unit.

SUMMARY

Example embodiments of the present invention provide simplified methods and devices for the synchronization of a control unit and at least one assigned peripheral unit of the type mentioned above, without impairing the accuracy and reliability of the synchronization.

According to example embodiments of the present invention, it is further provided in a method of this type that at least one synchronization character is appended by the control unit to a first data sequence of a data stream to be transmitted from the control unit to an assigned peripheral unit, and that the transmission of a second data sequence to be transmitted after the first data sequence is delayed in time, so that the second data sequence is transmitted from the control unit to the peripheral unit following the synchronization character.

Thus, a synchronization character may be inserted in defined manner into a data stream from the control unit to a respective peripheral unit without interrupting the data stream. This may be achieved by delaying that one data stream after a first data sequence, to which the synchronization character is to be appended, (at least) for the duration of that synchronization character, so that a second data sequence of the data stream originally immediately subsequent to that first data sequence is no longer transmitted from the control unit to the peripheral unit immediately after the first data sequence, but rather (immediately) following the synchronization character. Specifically, in order to delay the second data sequence, a further data stream, delayed in time compared to the one data stream to be transmitted to the peripheral unit, may be generated by the control unit, the further data stream representing a copy of the one data stream at least with regard to the further data sequences following the first data sequence. In this context, the specified time delay corresponds (at least) to the time duration of the synchronization character, and after the synchronization character has been added to the first data sequence of the one data stream, the data of the delayed further data stream are transmitted to the peripheral unit (instead of further data of the one data stream), and to be more precise, such that as first data of the further data stream, the second data sequence is transmitted (immediately) after the synchronization character.

The synchronization character is inserted by the control unit into the data stream at the instant which is selected or predefined as the instant of synchronization, e.g., independently of the instantaneous status of the communication from the control unit to a respective peripheral unit. Since the method hereof requires no interruption whatsoever in the communication, but rather only a minimal time delay of the data stream to be transmitted from the control unit to a respective peripheral unit, the insertion of a synchronization character into the data stream may also be carried out when, for a highly dynamic control, the exchange of data between the control unit and an assigned peripheral unit must not be interrupted.

In particular, the synchronization character may be a data word such as an 8b10b k-word. In the case of a transmission of data from the control unit to a respective peripheral unit in successive frames, such a data word may be inserted, for example, (between a first and a second, originally adjacent data sequence) into one of the data frames. The first and second data sequence, between which the synchronization character is inserted, may in each case be a data word, as well.

As a result, synchronization of two electronic assemblies connected to each other via a serial interface may be achieved, without a separate connection line between the two assemblies or an interruption of the ongoing communication (in the form of a data exchange) between the two assemblies being necessary for this purpose. Rather, the two assemblies are synchronized regardless of the ongoing communication simply by inserting a synchronization character into the data stream (at specific instants).

A respective synchronization character transmitted by the control unit to a peripheral unit may be used by the peripheral unit to generate a synchronization pulse for the purpose of synchronizing the peripheral unit with the control unit.

The synchronization character may subsequently be replaced (on the part of the peripheral unit) in the data stream by a blank character or pause character, e.g., a sequence of data which triggers no activity in the peripheral unit.

From the data stream arriving from the control unit, a data stream may be generated in the peripheral unit which is delayed in time (by the duration of one synchronization character) and which is utilized in the peripheral unit for processing the arriving data, until a synchronization character appears and is recognized in the data stream, to trigger the generation of a synchronization pulse. Then (beginning with a second data sequence which followed the synchronization character in the data stream transmitted by the control unit), instead of the delayed data stream, the undelayed data stream (e.g., a data stream moved forward relative to the first-named data stream) is processed in the peripheral unit, so that subsequently, a first and second data sequence which, after the insertion of the synchronization character, were meanwhile separated from each other by the latter, are able to be processed immediately following one another.

The synchronization character may be treated on the part of the peripheral unit like a blank or pause character once, based on it, the generation of a synchronization pulse has been initiated, in order to synchronize the time sequences in the peripheral unit with those in the control unit. It is then not necessary to eliminate the synchronization character from the data stream or to replace it by a blank or pause character.

The insertion into or elimination of a synchronization character from the data stream (on the part of the control unit or on the part of a peripheral unit) as well as possibly its replacement by a blank or pause character may, for example, be carried out with the aid of a multiplexer.

Due to the section-by-section delay of the data stream on the part of the control unit and the section-by-section relative forward displacement of the data stream on the part of a peripheral unit after the arrival and recognition or processing of a synchronization character, no data to be transmitted is lost upon insertion of the synchronization character on one hand, and on the other hand, no interruption in the data stream occurs upon elimination of the synchronization character. In this context, with regard to the second-named measure, there are the alternatives/additions discussed above such as the insertion of a blank or pause character into the data stream, for example.

After the insertion of a synchronization character into the data stream, first of all (following the synchronization character and beginning with the second data sequence), a time-delayed version of the data stream is transmitted by the control unit. So as not to further delay the data stream with each insertion of a synchronization character, at a suitable instant after the insertion of a synchronization character and the delay of the data stream associated with it, the data stream is reset, so that the undelayed data stream is again transmitted from the control unit to a respective peripheral unit. Upon resetting the data stream, a blank or pause character may be eliminated from the data stream on the part of the control unit. In this manner, the data sequence initially transmitted immediately after this blank or pause character directly follows the data sequence initially transmitted immediately before the blank or pause character. This corresponds to a possible procedure described above upon elimination of the synchronization character from the data stream on the part of a peripheral unit.

The elimination of a blank or pause character from the data stream generated by the control unit does not mean a loss of information, since the blank or pause characters trigger no activity on the part of a peripheral unit in any case.

If, during the communication between the control unit and a peripheral unit, in each case a synchronization character is transmitted recurrently in time, e.g., at specific predefined time intervals, from the control unit to the peripheral unit, this then ensures a lasting synchronization of these two assemblies, even when after the transmission of a first synchronization character, the original synchronization could not be maintained, for example, as the result of a temporary disturbance. A recurrent, especially cyclical synchronization of the control unit and a respective peripheral unit thus represents a safety measure in order to ensure a permanent synchronization, even in the event of disturbances occurring in the meantime.

If, in the case of a provided transmission of synchronization characters recurring in time, periodically no blank or pause characters are to be transmitted which would allow the above-described resetting of the control unit, e.g., by the elimination of a blank or pause character from or insertion of a blank or pause character into the data stream, the transmission of a synchronization character may be suppressed in the individual case.

Further features and aspects of example embodiments of the present invention are described in more detail with reference to the appended Figures.

BRIEF DESCRIPTION OF THE DRAWINGS

FIG. 3A illustrates the data stream illustrated in FIG. 2A, as it is received by a peripheral unit.

FIG. 3B illustrates the elimination of a synchronization character from the data stream illustrated in FIG. 2B on the part of a peripheral unit.

FIG. 3c illustrates a modification of the operation illustrated in FIG. 3B.

FIG. 4 illustrates an example embodiment of a transmitter unit for the control unit illustrated in FIG. 1.

FIG. 5A illustrates an example embodiment of a receiver unit for the peripheral unit illustrated in FIG. 1.

FIG. 5B illustrates a modification of the receiver unit illustrated in FIG. 5A.

DETAILED DESCRIPTION

Figure 1:
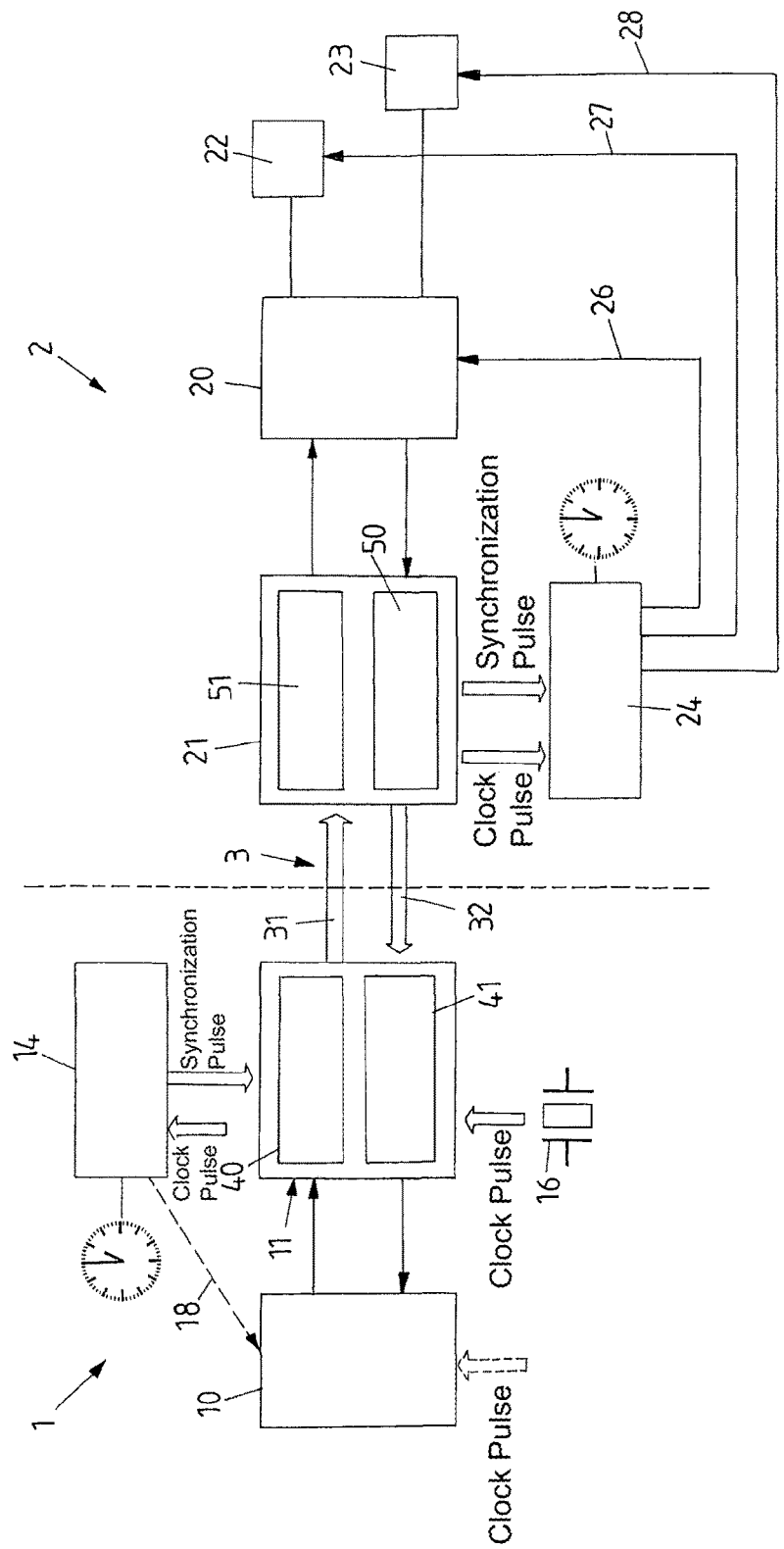
FIG. 1 schematically illustrates a control unit and an assigned peripheral unit which exchange data via a serial interface.

FIG. 1 schematically illustrates a control unit 1 which is connected to a peripheral unit 2 via a serial interface 3. Control unit 1 may include an electronic assembly (provided on a printed circuit board, for example), which contains at least one sequencing control 10 (e.g., in the form of a processor) that, for example, is used for the (digital) control of sequences at assigned peripheral unit 2. The peripheral unit may be formed by a further electronic assembly provided, for example, on a printed circuit board which, for instance, contains actuators 22, e.g., in the form of power electronics having PWM modulators, as well as sensors 23 for the measurement of current, for example.

In the exemplary embodiment illustrated, interface 3 is arranged as a duplex interface having data channels 31, 32 for the transmission of data from control unit 1 to peripheral unit 2 on one hand, and from peripheral unit 2 to control unit 1 on the other hand. For the exchange of data via serial interface 3, in each case a data-transmission unit 11 and 21 is provided on the side of control unit 1 and on the side of peripheral unit 2, respectively, the data-transmission units in turn each including a transmitter unit 40 and 50 and a receiver unit 41 and 51, respectively.

For example, control unit 1 may be employed—via sequencing control 10 and using output signals of sensors 23 at peripheral unit 2—to control the operation of actuators 22. To that end, control unit 1 and peripheral unit 2 exchange data via serial interface 3, in doing which, for example, actual values of currents measured by sensors 23 are transmitted from peripheral unit 2 to control unit 1, and control unit 1—by evaluating the signals received from peripheral unit 2—transmits data to peripheral unit 2 which ensure a defined operation of actuators 22. In order to write data into actuators 22 or to read out data from sensors 23 in accordance with the commands which are transmitted in the data stream from control unit 1 to peripheral unit 2, the latter has a processing unit 20 in the present example.

Specifically, control unit 1 having sequencing control 10 may be used for controlling a control loop by, on one hand, calling for data (actual values) from a sensor, e.g., in the form of an ammeter, and on the other hand, on this basis, calculating setpoint values for an actuator, e.g., a PWM modulator, and outputting them to corresponding peripheral unit 2.

Control unit 1 is assigned a clock-pulse generator 16 that generates a clock pulse with which the data is transmitted from control unit 1 to peripheral unit 2. On the side of peripheral unit 2, the corresponding clock pulse is able to be recovered and supplied to a cycle control 24 assigned to peripheral unit 2. A defined time pattern of the data transmission and processing is thereby able to be generated. To this end, the clock pulse generated by clock-pulse generator 16 and/or a control signal 18 of a cycle control 14 acted upon by the clock signal is/are supplied, in particular, to sequencing control 10 of control unit 1.

To permit reliable, defined control of actuators 22 at peripheral unit 2 by control unit 1 on the basis of the measured values obtained from sensors 23, a time synchronization of the data processing at control unit 1 on one hand and at peripheral unit 2 on the other hand is provided. To that end, synchronization characters, e.g., recurring over time, are transmitted by control unit 1 to peripheral unit 2. They synchronize the time pattern (defined by clock-pulse generator 16) in which data are processed on the part of peripheral unit 2, for example, in order to regulate or control the operation of actuators 22 or to prompt the readout of measured values from sensors 23, with the data processing by control unit 1.

In order to trigger a synchronization, cycle control 14 assigned to control unit 1 generates a synchronization pulse which brings about the transmission of a synchronization character in the data stream from control unit 1 to peripheral unit 2 (and which is output to data-transmission unit 11 for that purpose). In peripheral unit 2, a corresponding synchronization pulse is recovered from the synchronization character and fed to cycle control 24.

For example, peripheral unit 2, controlled by control unit 1, especially its sequencing control 10, is able to operate as follows. Data, also including commands, arriving at peripheral unit 2 from control unit 1 are passed on by its data-transmission unit 21 to processing unit 20. Conversely, data-transmission unit 21 receives response data generated in peripheral unit 2, for example, measured values of sensors 23, which in turn are to be transmitted to control unit 1. Furthermore, from the data stream arriving from control unit 1, data-transmission unit 21 extracts the clock signal (generated by clock-pulse generator 16), as well as the synchronization characters (induced by cycle control 14 by the generation of a synchronization pulse), synchronization pulses in turn being obtained in peripheral unit 2 from the synchronization characters. Both the clock signal and the synchronization pulses are made available to cycle control 24 of peripheral unit 2.

With the aid of a respective synchronization pulse, the internal clock of peripheral unit 2 is synchronized with that of control unit 1, so that as a result, the data processing (clocked by the clock signal generated at control unit 1) is synchronized in time on the part of the control unit and of peripheral unit 2.

Using the clock pulse predefined by control unit 1, cycle control 24 of peripheral unit 2 generates various control signals 26, 27, 28 which, for example, are passed on to processing unit 20 as well as to actuators 22 and sensors 23. In this manner, the sequences in peripheral unit 2 are able to be time-stacked. Thus, for example, first of all, a sensor 23 in the form of an ammeter may be informed by a signal 28 that it is to make a measured value available. Processing unit 20 subsequently receives the command, via a signal 26, to fetch that measured value and to send it to data-transmission unit 21 of peripheral unit 2, etc.

By synchronizing the time sequences at control unit 1 on one hand and peripheral unit 2 on the other hand, the time pattern in which the sequences in peripheral unit 2 are controlled by processing unit 20 matches in defined manner the time pattern that is used by control unit 1.

Figure 6:
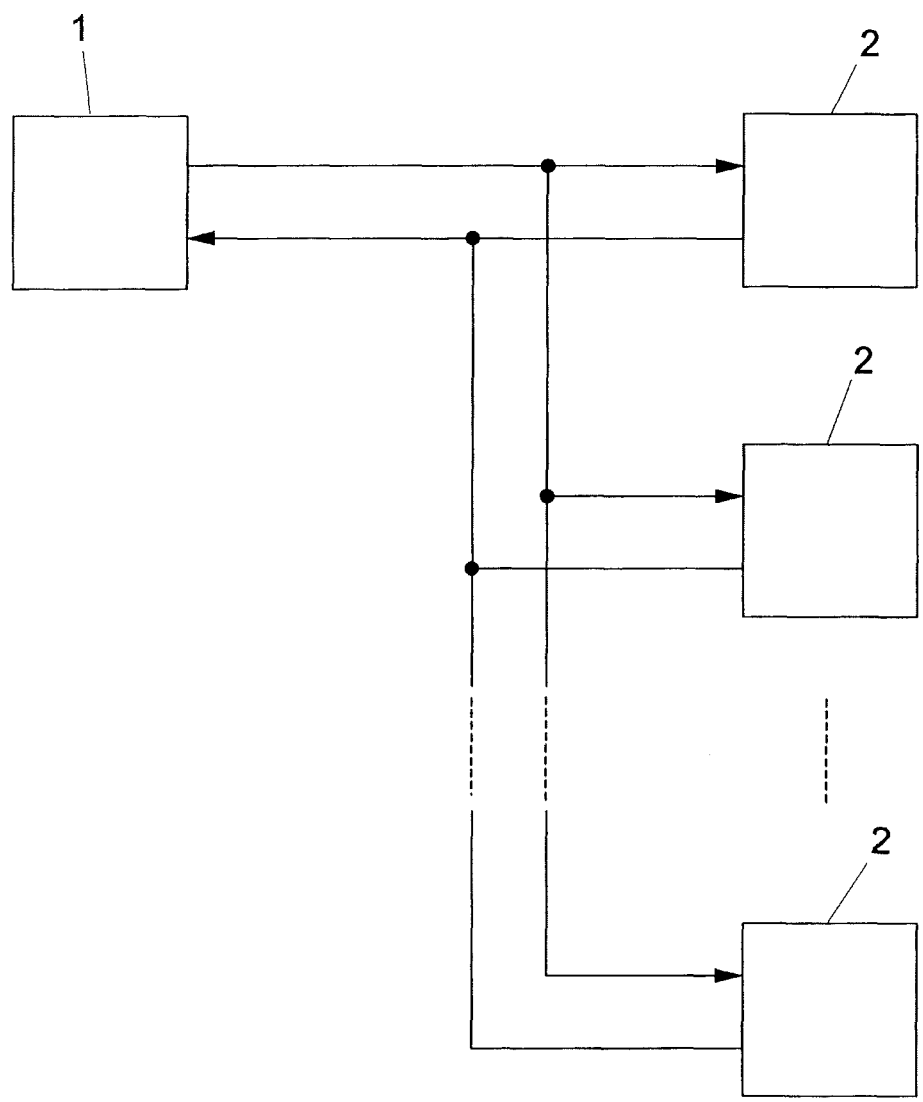
FIG. 6 schematically illustrates a control unit, to which a plurality of peripheral units is connected.

If a plurality of peripheral units 2 connected to control unit 1 are operated with the aid of control unit 1, as illustrated in FIG. 6, then the time sequences may be synchronized between control unit 1 and each assigned peripheral unit 2 using the procedure described above.

Particulars concerning the transmission of the synchronization characters from control unit 1 to peripheral unit 2, and specifically, without providing a separate connection line for this purpose and without interrupting the on-going transmission of data from control unit 1 to peripheral unit 2, are described in the following with reference to FIGS. 2A to 3C.

Figure 2A:
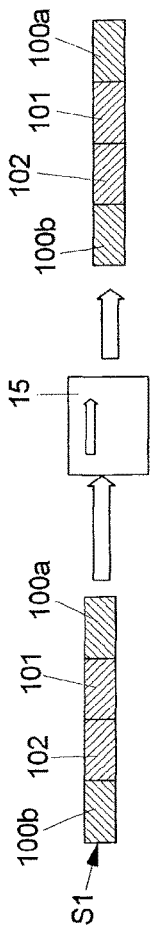
FIG. 2A illustrates a data stream, generated at the control unit, for transmission to a peripheral unit.

FIG. 2A illustrates data stream S1 from control unit 1 to a peripheral unit 2 during normal operation and without synchronization, to be more precise, using the transmission of one data frame by control unit 1, for example.

The data frame (as a part of data stream S1) is represented in FIG. 2A by four data sequences 100a, 101, 102 and 100b. Of these, first data sequence 100a identifies the beginning of the frame and last data sequence 100b identifies the end of the frame. Data sequences 101 and 102 in between may each contain useful data, for example, which are to be transmitted by control unit 1 to peripheral unit 2 for the operation of actuators 22, for example, or to prompt the readout of data from sensors 23 (see FIG. 1).

In this context, one respective data frame may be formed in particular by a plurality of data words, among which may be characters 100a and 100b that represent the beginning and the end of a frame, as well as further data words (data sequences 101, 102) having useful data. Moreover, data words in the form of blank or pause characters may be defined, which are always transmitted when no activity is intended to be triggered at peripheral unit 2.

For example, in the case of a customary 8b/10b-coding of the data stream to be transmitted from control unit 1 to peripheral unit 2, in each case, e.g., one 8b/10b k-word may be provided to identify the beginning of a frame, to identify the end of a frame, to form a synchronization character, as well as to define a blank or pause character ("comma").

Data stream S1 passes unchanged through a multiplexer 15 on the side of the control unit and is transmitted in the originally generated form to peripheral unit 2. There, it is received in corresponding manner as illustrated in FIG. 3A.

Figure 2B:
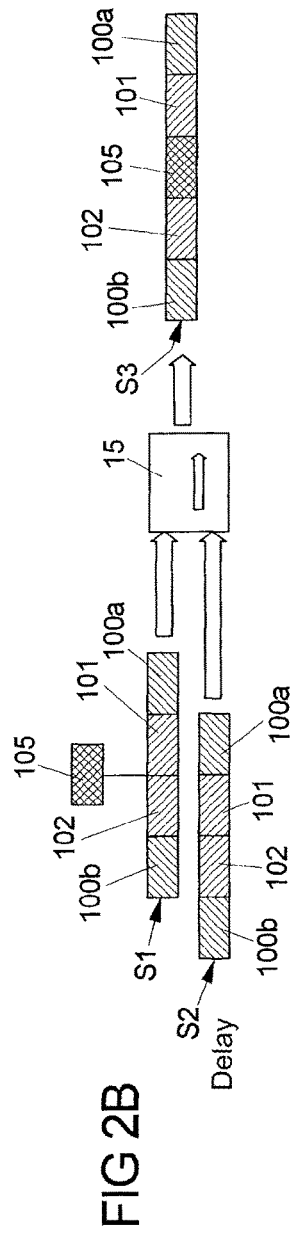
FIG. 2B illustrates the insertion of a synchronization character into the data stream illustrated in FIG. 2A.

In contrast, FIG. 2B shows a situation in which a synchronization character 105 is to be inserted into data stream S1 on the part of control unit 1 (compare FIG. 1), that is, exemplarily in the present case, into the data frame explained above with reference to FIG. 2A. This is accomplished in a multiplexer 15 of control unit 1.

In that multiplexer 15, synchronization character 105 is appended to a first data sequence 101 of data stream S1.

In the present example, a first data sequence denotes any data sequence of data stream S1 which is characterized merely by the fact that the transmission of a synchronization character, triggered by cycle control 14, is to take place at an instant that immediately follows the transmission of that first data sequence 101. Therefore, in principle, the corresponding data sequence—depending on the instant of its insertion—may be at any position in data stream S1 to be transmitted.

In this context, the intention is to ensure that second data sequence 102, originally to be transmitted immediately after first data sequence 101 within data stream S1, does not get lost due to the insertion of synchronization character 105 into the data stream, but rather, is transmitted immediately after that synchronization character 105. To that end, as illustrated in FIG. 2B, a copy of data stream S1 to be transmitted is produced, this copy being delayed in time (exactly) by the duration of synchronization character 105 compared to data stream S1 to be transmitted originally. This delayed copy of the original data stream is shown in the lower second line in FIG. 2B. The individual data of that delayed data stream S2 are the same as those of undelayed data stream S1. There is merely a time delay by the duration of synchronization character 105.

Delayed data stream S2—just like undelayed data stream S1—is supplied to multiplexer 15. As soon as synchronization character 105 has been appended to first data sequence 101 of undelayed data stream S1, multiplexer 15 switches over, and instead of further data of this data stream S1, outputs the data of delayed data stream S2. A data stream S3 is thereby available at the output of multiplexer 15 which contains synchronization character 105 between first data sequence 101 and second data sequence 102, the data transmitted before synchronization character 105 coming from undelayed data stream S1, and the data transmitted after synchronization character 105 coming from delayed data stream S2.

The procedure described above with reference to FIG. 2B is explained in greater detail in the following on the basis of switchover operations in multiplexer 15 put in more concrete terms by way of example.

Figure 2C:
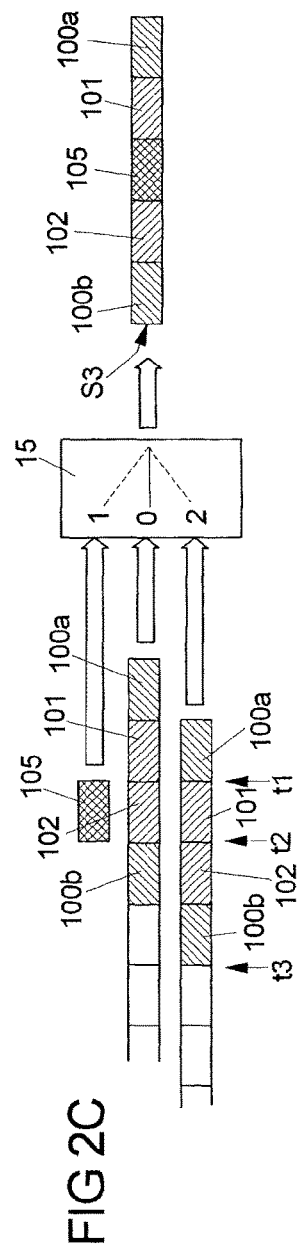
FIG. 2C further illustrates the operation illustrated in FIG. 2B.

The initial state of multiplexer 15 is denoted by "0" in FIG. 2C. In this state, multiplexer 15 outputs undelayed data stream S1. If, due to a synchronization pulse of cycle control 14, the transmission of a synchronization character 105 is called for, then the multiplexer is switched over at corresponding instant $t_1$ to state "1". In this state, multiplexer 15 outputs synchronization character 105. After the output of synchronization character 105, as of corresponding instant $t_2$, the multiplexer is switched to state "2", in which it outputs delayed data stream S2.

If a blank or pause character is subsequently recognized in the undelayed data stream, this may be used to switch the multiplexer at corresponding instant $t_3$ to state "0" again, in which it transmits the undelayed data stream. The accompanying loss of a blank or pause character in the data transmission is not problematic, since these characters trigger no action on the part of peripheral unit 2 in any case.

The switching operations described herein may be initiated by a transmission sequencing control, as described in greater detail below in an exemplary embodiment with reference to FIG. 4.

As illustrated in FIGS. 3B and 3C, synchronization character 105 is to be eliminated from data stream S3 again on the part of peripheral unit 2, once the former has been recognized and consequently the generation of a synchronization pulse has been brought about, and specifically, without a gap (interruption) developing in the data stream in so doing. A first possibility for this is illustrated in FIG. 3B.

Accordingly, corresponding to the procedure in control unit 1, a copy—delayed in time by the duration of synchronization character 105—of arriving data stream S3 is created in peripheral unit 2. According to FIG. 3B, the two data streams S3, S4—both the data stream arriving from control unit 1 and its copy delayed in time—are fed to a multiplexer 25 of peripheral unit 2. However, in contrast to FIG. 2B, according to FIG. 3B, first of all (up to the appearance of a synchronization character in the data stream), delayed data stream S4 is output by multiplexer 25. With the recognition of synchronization character 105 in delayed data stream S4, multiplexer 25 switches over and the data of delayed data stream S4 are no longer present at its output, but rather the data of undelayed data stream S3 (which is moved forward in time relative to delayed data stream S4) arriving from control unit 1. Accordingly, of data stream S5 available according to FIG. 3B at the output of multiplexer 25, first data sequences 100a, 101, which were transmitted before synchronization character 105, come from delayed data stream S4, while further data 102, 100b, . . . following after that come from undelayed data stream S3 generated in control unit 1.

As a result, a data stream S5 is at the output of multiplexer 25 which, taken as a whole, corresponds exactly to data stream S1 generated in control unit 1 prior to the insertion of synchronization character 105 and to be transmitted from there to peripheral unit 2.

FIG. 3C illustrates a modification of the exemplary embodiment illustrated in FIG. 3B. In place of eliminated synchronization character 105, peripheral unit 2 with the aid of multiplexer 25 inserts a blank or pause character 106 into received data stream S4. The latter triggers no activity on the part of peripheral unit 2, so that the information content of the data stream is not altered by it.

Therefore, in the exemplary embodiment illustrated in FIG. 3C, only one data stream (e.g., delayed data stream S4) as well as one blank or pause character are supplied to multiplexer 25 of peripheral unit 2, and synchronization character 105 is replaced in data stream S4 by a blank or pause character 106, in order to eliminate synchronization character 105 from data stream S4.

For example embodiments of multiplexer 25 of peripheral unit 2, as well as of the switchover processes associated with it, reference is made to the pertinent description of multiplexer 15 of control unit of FIG. 1.

Due to the delay of data stream S1, generated by control unit 1, upon insertion of a synchronization character into that data stream S1, it is necessary to reset the resultant data stream in time again if a further time delay is not to be added cumulatively with each transmission of a synchronization character. The data stream may be reset in an easy manner by eliminating a blank or pause character from the data stream generated at control unit 1.

For example, this may be implemented in the manner that after the output of a synchronization character by multiplexer 15, the next blank or pause character may be used to reset the data stream. If, after the output of a synchronization character by multiplexer 15, a blank or pause character is recognized in the data stream supplied to multiplexer 15, then multiplexer 15 is switched over or switched back so that it outputs the undelayed data stream again. In so doing, the blank or pause character in question is not transmitted with it, which represents no loss of information, however, since such a character triggers no action on the part of respective peripheral unit 2 in any case.

After multiplexer 25 of a peripheral unit 2 has received a synchronization character, it may be reset in a manner corresponding to the resetting of multiplexer 15 of control unit 1 described above. In this case, multiplexer 25 is switched so that it transmits the delayed data stream again instead of the undelayed data stream. This corresponds to the adding of a blank or pause character in the respective data stream, which again does not represent any change in the information content, since blank or pause characters trigger no actions in peripheral unit 2.

FIG. 4 illustrates an example embodiment of a transmitter unit 40 of control unit 1. In this case, one possibility in particular for the integration of multiplexer 15 into control unit 1 also becomes clear from FIG. 4.

According to FIG. 4, multiplexer 15 is assigned to transmitter unit 40. Connected upstream of multiplexer 15 is a delay unit 42 by which a data stream may be generated that is delayed relative to the data stream originally generated. To generate the original data stream, a converter 44 is used which is implemented as an 8b10b-converter in the illustrated exemplary embodiment, and which receives the data to be transmitted from an intermediate data storage 45 that may take the form of a FIFO memory, for example.

Both the data stream generated by converter 44 and a data stream delayed by delay unit 42 relative to this data stream are fed to multiplexer 15. Moreover, multiplexer 15 may be fed a synchronization character SYNC which, as described with reference to FIG. 1, is made available because of a synchronization pulse supplied by a cycle control 14.

To control the sequences in transmitter unit 40, a primary transmission sequencing control 43 is used that controls which data are output in each instance by multiplexer 15. To that end, in particular, the synchronization pulses supplied by cycle control 14 are also fed to transmission sequencing control 43.

During operation of control unit 1, its central sequencing control 10 writes data, and especially commands, into intermediate data storage 45 of transmitter unit 40, from which converter 44 generates a data stream. As a rule, this is accomplished by inserting the data/commands received from intermediate data storage 45 into a data stream which, in the absence of data/commands, includes blank or pause characters.

If a synchronization pulse arrives at transmission sequencing control 43, it then switches over multiplexer 15 (after the character presently to be transmitted has been completely output) such that instead of the original data stream, the corresponding synchronization character is transmitted. Subsequently, a switchover is made to the delayed data stream, as described above with reference to FIGS. 2B and 2C.

If, after the transmission of a synchronization character, transmission-sequencing control 43 recognizes a blank or pause character in the delayed data stream, it then switches multiplexer 15 back, so that it again transmits the original data stream, in doing which, only the blank or pause character in the data stream being lost.

FIG. 5A illustrates an example embodiment of a receiver unit 51 of peripheral unit 2 illustrated in FIG. 1, which is suitable for performing the method illustrated in FIG. 3C. In particular, one possibility for the integration of a multiplexer 25 into peripheral unit 2 also becomes clear from it. Connected upstream of multiplexer 25 is a delay unit 52 which, from the data stream arriving from transmitter unit, generates a delayed data stream and outputs it to multiplexer 25. Furthermore, individual blank or pause characters "IDLE" may be fed to multiplexer 25.

To control the sequences in receiver unit 51, a receiving sequencing control 53 is used. In addition, it is able to extract the clock signal from the data stream arriving from transmitter unit. Furthermore, in response to the arrival and recognition of a synchronization character (as component of the data stream transmitted by transmitter unit), the receiving sequencing control generates a synchronization pulse.

Downstream of multiplexer 25 is a converter 54 which decodes the data stream (810b-coded in the exemplary embodiment), and outputs it to processing unit 20 of peripheral unit 2 for further processing (see FIG. 1). Additionally, an intermediate data storage may also be assigned to converter 54.

Delay unit 52 is provided in the exemplary embodiment illustrated in FIG. 5A because, in order to exchange a synchronization character for a blank or pause character as described above with reference to FIG. 3C, the arrival of a synchronization character must first be recognized before multiplexer 25 can be switched over. To that end, the data stream arriving from transmitter unit is fed immediately to receiving sequencing control 53, e.g., without delay by delay unit 52. In an alternative exemplary embodiment, according to which converter 54 simply ignores a respective synchronization character or treats it like a blank or pause character, delay unit 52, and additionally multiplexer 25 as well, could be omitted. Receiver unit 51 would then include converter 54 as the central component, as well as a receiving sequencing control 53.

FIG. 5B illustrates a further exemplary embodiment of a receiver unit 51 for peripheral unit 2 illustrated in FIG. 1, and specifically, in a form for performing the method illustrated in FIG. 3B.

Multiplexer 25 of peripheral unit 2 is assigned to receiver unit 51, as well, and a delay unit 52 is again connected upstream of the multiplexer.

In the exemplary embodiment illustrated in FIG. 5B, the data stream transmitted by control unit 1 is supplied, on one hand, to multiplexer 25 in delayed form via delay unit 52, and on the other hand, directly in undelayed form. Prior to the transmission of a synchronization character, multiplexer 25 outputs the delayed data stream, as described with reference to FIG. 3B. If receiving sequencing control 53 recognizes a synchronization character in the arriving, undelayed data stream, it switches multiplexer 25 over so that it transmits the undelayed data stream. At the same time, receiving sequencing control 53 generates a synchronization pulse.

To further process the data stream output by multiplexer 25, a converter 54 may again be connected downstream of it.

If, after a synchronization character has been output by multiplexer 25, receiving sequencing control 53 recognizes a blank or pause character in the arriving data stream, it then switches multiplexer 25 over so that it again outputs the delayed data stream. The result is that the corresponding blank or pause character is transmitted a second time—without a change of the information content in the data stream.

What is claimed is:

1. A method for synchronizing a control unit and at least one peripheral unit having actuators and/or sensors, the control unit and the peripheral unit adapted to exchange data with each other via a serial interface, comprising:
    transmitting, from the control unit to the peripheral unit, data for operation of the actuators and/or sensors, and at least one synchronization character for synchronization;
    wherein the transmitting includes:
        appending, by the control unit, the synchronization character to a first data sequence of a first data stream to be transmitted from the control unit to the peripheral unit;
        delaying in time by the control unit, transmission of a second data sequence to be transmitted after the first data sequence, so that the second data sequence is transmitted by the control unit to the peripheral unit following the synchronization character; and
    wherein the delaying includes generating, by the control unit, a further data stream which is delayed in time relative to the first data stream to be transmitted to the Peripheral unit and which, at least with respect to data sequences following the first data sequence, represents a copy of the first data stream, the time delay of the further data stream corresponding to a duration of the synchronization character, and after the synchronization character is appended to the first data sequence of the first data stream, the data of the delayed further data stream beginning with the second data sequence is transmitted, instead of the data of the first data stream, to the peripheral unit.

2. The method according to claim 1, wherein prior to appending the synchronization character into first the data stream, the first and second data sequences directly follow each other.

3. The method according to claim 1, further comprising eliminating the synchronization character from the data stream by the peripheral unit after a synchronization pulse has been generated based on the synchronization character, in order to synchronize time sequences in the peripheral unit with time sequences in the control unit.

4. The method according to claim 3, wherein the peripheral unit substitutes a different character for the synchronization character.

5. The method according to claim 4, wherein the different character includes a pause character.

6. The method according to claim 3, further comprising moving forward in time, by the peripheral unit, the second data sequence following the synchronization character relative to the first data sequence transmitted immediately before the synchronization character, so that the second data sequence immediately follows the first data sequence transmitted before the eliminated synchronization character.

7. The method according to claim 6, further comprising generating, in the peripheral unit, a further data stream that is delayed in time relative to the data stream transmitted from the control unit to the peripheral unit and which, at least with respect to data sequences transmitted before the synchronization character, represents a copy of the first data stream, a time delay of the further data stream corresponding to a duration of the synchronization character, and prior to recognition of the synchronization character in the peripheral unit, the time-delayed, further data stream being utilized for processing in the peripheral unit, and after the recognition of the synchronization character, beginning with the second data sequence, the first data stream being utilized for processing in the peripheral unit.

8. The method according to claim 1, wherein the delayed data stream transmitted after insertion of the synchronization character by the control unit is reset by again transmitting the first data stream to the peripheral unit.

9. The method according to claim 1, wherein after the transmission of the synchronization character, to compensate for the delay, a pause character is eliminated from the data stream transmitted after the insertion of the synchronization character by the control unit.

10. A system, comprising:
    a control unit;
    a serial interface; and
    at least one peripheral unit including actuators and/or sensors, the peripheral unit connected to the control unit via the serial interface, the peripheral unit including a processing unit adapted to process data, transmitted from the control unit to the peripheral unit, to operate the actuators and/or the sensor, and to synchronize the peripheral unit and the control unit;
    wherein the control unit includes a cycle control adapted to induce transmission of at least one synchronization character from the control unit to the peripheral unit, the control unit including a transmitter unit adapted to append the synchronization character to a first data sequence of a first data stream to be transmitted by the control unit to the peripheral unit and to delay in time transmission of a second data sequence to be transmitted after the first data sequence, so that the second data sequence is transmitted by the control unit to the peripheral unit following the synchronization character; and
    wherein the control unit is adapted to generate a further data stream which is delayed in time relative to the first data stream to be transmitted to the peripheral unit and which, at least with respect to data sequences following the first data sequence, represents a copy of the first data stream, the time delay of the further data stream corresponding to a duration of the synchronization character, and after the synchronization character is appended to the first data sequence of the first data stream, the data of the delayed further data stream beginning with the second data sequence is transmitted, instead of the data of the first data stream, to the peripheral unit.

11. The system according to claim 10, wherein the transmitter unit includes a delay unit adapted to generate a data stream delayed relative to the first data stream, in order to provide a time-delayed transmission of the second data sequence.

12. The system according to claim 11, wherein the transmitter unit includes a multiplexer adapted to switch over between the first data stream and the delayed data stream.

13. The system according to claim 12, wherein the multiplexer is adapted to insert the synchronization character into the data stream to be transmitted.

14. The system according to claim 10, wherein the peripheral unit includes a receiver unit adapted to receive data transmitted by the transmitter unit, and the receiver unit including a delay unit adapted to generate a data stream delayed relative to the data stream arriving from the transmitter unit, in order to provide for elimination of the synchronization character from the data stream again.

15. A device adapted to perform the method recited in claim 1, comprising:
   a control unit;
   a serial interface; and
   at least one peripheral unit including actuators and/or sensors, the peripheral unit connected to the control unit via the serial interface, the peripheral unit including a processing unit adapted to process data, transmitted from the control unit to the peripheral unit, to operate the actuators and/or the sensor, and to synchronize the peripheral unit and the control unit;
   wherein the control unit includes a cycle control adapted to induce transmission of at least one synchronization character from the control unit to the peripheral unit, the control unit including a transmitter unit adapted to append the synchronization character to a first data sequence of a first data stream to be transmitted by the control unit to the peripheral unit and to delay in time transmission of a second data sequence to be transmitted after the first data sequence, so that the second data sequence is transmitted by the control unit to the peripheral unit following the synchronization character; and
   wherein the control unit is adapted to generate a further data stream which is delayed in time relative to the first data stream to be transmitted to the peripheral unit and which, at least with respect to data sequences following the first data sequence, represents a copy of the first data stream, the time delay of the further data stream corresponding to a duration of the synchronization character, and after the synchronization character is appended to the first data sequence of the first data stream, the data of the delayed further data stream beginning with the second data sequence is transmitted, instead of the data of the first data stream, to the peripheral unit.

16. The method according to claim 1, wherein the synchronization character includes a data word.

17. The method according to claim 1, wherein the synchronization character includes multiple data bits.

18. The system according to claim 10, wherein the synchronization character includes a data word.

19. The system according to claim 10, wherein the synchronization character includes multiple bits.

20. The device according to claim 15, wherein the synchronization character includes a data word.

21. The device according to claim 15, wherein the synchronization character includes multiple bits.

* * * * *